(12) United States Patent
Karr

(10) Patent No.: US 6,657,859 B1
(45) Date of Patent: Dec. 2, 2003

(54) DEVICE BAY HEAT EXCHANGER FOR A PORTABLE COMPUTING DEVICE

(75) Inventor: Ben Karr, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 09/608,592

(22) Filed: Jun. 30, 2000

(51) Int. Cl.$^7$ .................................................. H05K 7/20
(52) U.S. Cl. ...................... 361/687; 361/695; 361/697; 165/104.21; 165/104.33; 454/184
(58) Field of Search ..................... 361/683, 665–695, 361/697, 700, 704, 707–710, 714–722, 735, 744, 761–764, 782–785, 790–792; 174/15.2, 16.3, 252, 52.1, 15.1; 257/686, 697, 706–727; 165/80.3, 80.4, 104.21, 104.22, 104.23, 104.32, 104.33, 104.34, 185; 62/252.2; 437/209, 221–222; 438/106, 118, 584, 675; 364/708.1; 29/832, 841, 854, 729, 739; 454/184

(56) References Cited

U.S. PATENT DOCUMENTS

| | | | |
|---|---|---|---|
| 5,475,563 A | * 12/1995 | Donahoe et al. | ............ 361/695 |
| 5,898,569 A | * 4/1999 | Bhatia | .................. 361/700 |
| 5,946,191 A | * 8/1999 | Oyamada | ..................... 361/700 |
| 5,955,955 A | * 9/1999 | Corcoran et al. | ........... 340/607 |
| 5,959,836 A | * 9/1999 | Bhatia | .......................... 361/687 |
| 5,974,556 A | * 10/1999 | Jackson et al. | .............. 713/322 |
| 6,058,009 A | * 5/2000 | Hood et al. | .................. 361/687 |
| 6,084,769 A | * 7/2000 | Moore et al. | ............... 361/687 |
| 6,111,751 A | * 8/2000 | Sakuyama | ................... 361/704 |
| 6,118,654 A | * 9/2000 | Bhatia | ......................... 361/687 |
| 6,172,871 B1 | * 1/2001 | Holung et al. | .............. 361/687 |
| 6,181,553 B1 | * 1/2001 | Cipolla et al. | ............... 361/687 |
| 6,196,003 B1 | * 3/2001 | Macias et al. | ................ 62/3.7 |
| 6,407,916 B1 | * 6/2002 | Konstad | ..................... 361/687 |
| 6,460,099 B1 | * 10/2002 | Stryker et al. | ................ 710/74 |

FOREIGN PATENT DOCUMENTS

| | | | | |
|---|---|---|---|---|
| JP | 02000002493 A | * | 1/2000 | ........... F28D/15/02 |
| JP | 02000165077 A | * | 6/2000 | ........... H05K/7/20 |
| JP | 02001044679 A | * | 2/2001 | ........... H05K/7/20 |

* cited by examiner

*Primary Examiner*—Michael Datskovsky
(74) *Attorney, Agent, or Firm*—Blakely, Sokoloff, Taylor & Zafman LLP

(57) ABSTRACT

A computing device and a device bay heat exchanger. The device bay heat exchanger includes a first heat transfer element and a second heat transfer element. The first heat transfer element has a portion thermally coupled to an electronic component. The first and the second heat transfer element conformally engage each other yet are removable from each other.

18 Claims, 8 Drawing Sheets

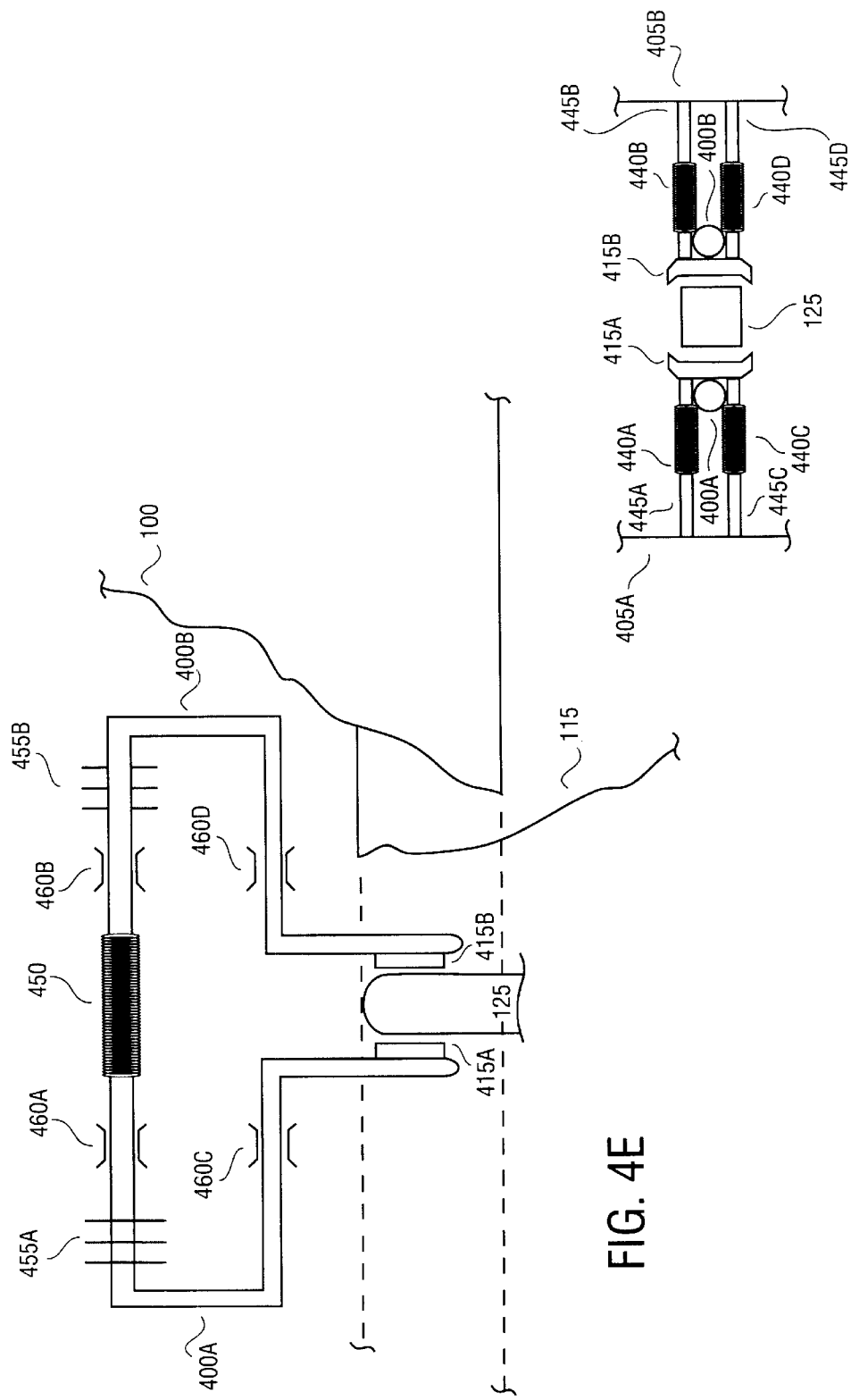

DEVICE BAY HEAT EXCHANGER FOR A PORTABLE COMPUTING DEVICE

FIELD OF THE INVENTION

The present invention pertains to the field of the heat removal from electronic components. More particularly, this invention relates to heat removal from a portable computing device.

BACKGROUND

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base the portable computer system. A processor is one component that generates a large amount of heat in a typical processor system. Other electrical components which also generate heat include memory circuits, power supply circuits, and circuit boards such as video card.

Maintaining operating temperatures of computer system components below certain levels is important to ensure performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Since the computer base size is generally kept to a minimum, and the computer base contains both the input device and numerous other electronic components, there may be inadequate space to dissipate enough heat to keep the electronic components within their acceptable range of operating temperatures. Additionally, heat dissipation through the bottom of the base is limited because the computer is usually operated on a relatively flat low conductance surface.

One prior art method for removing heat from the base of a portable computing device involves transferring heat from the base of the device to the display. The technique of transferring heat to the display is limited due to the thermal and mechanical difficulties involved with transferring heat through the hinge of the computing device.

As a result, there exist a need to overcoming, or at least reducing the effects of, one or more of the problems set forth above.

BRIEF DESCRIPTION OF THE FIGURES

The present invention is illustrated by way of example and not limitation in the figures of the accompanying drawings.

FIG. 4b illustrates a partial cross section elevation view of the jaws heat exchanger of FIG. 4a.

FIG. 4d illustrates a partial cross section elevation view of a jaws heat exchanger according to another embodiment.

FIG. 4e illustrates a jaws heat exchanger according to another embodiment of the present invention.

DETAILED DESCRIPTION

The present invention provides a heat exchanger that is insertable into a device bay of a portable computing device. In the following description, numerous specific details, such as component types, heat dissipation device sizes, and heat dissipation component mounting structures, and locations are set forth in order to provide a more thorough understanding of the present invention. It will be appreciated, however, by one skilled in the art that the invention may be practiced without such specific details.

The present invention provides numerous solutions to remove heat from a portable computing device through use of a heat exchanger inserted into a device bay of a portable computer. With the ability to remove additional heat, it may become possible to operate components such as a processor in a portable computing device at a higher power level by either increasing the supplied voltage, reducing clock throttling, or increasing the operating frequency of the processor. As a result, a portable computing device may be able to obtain higher performance when a heat exchanger is inserted in a device bay of the portable computing device.

Figure 1A:
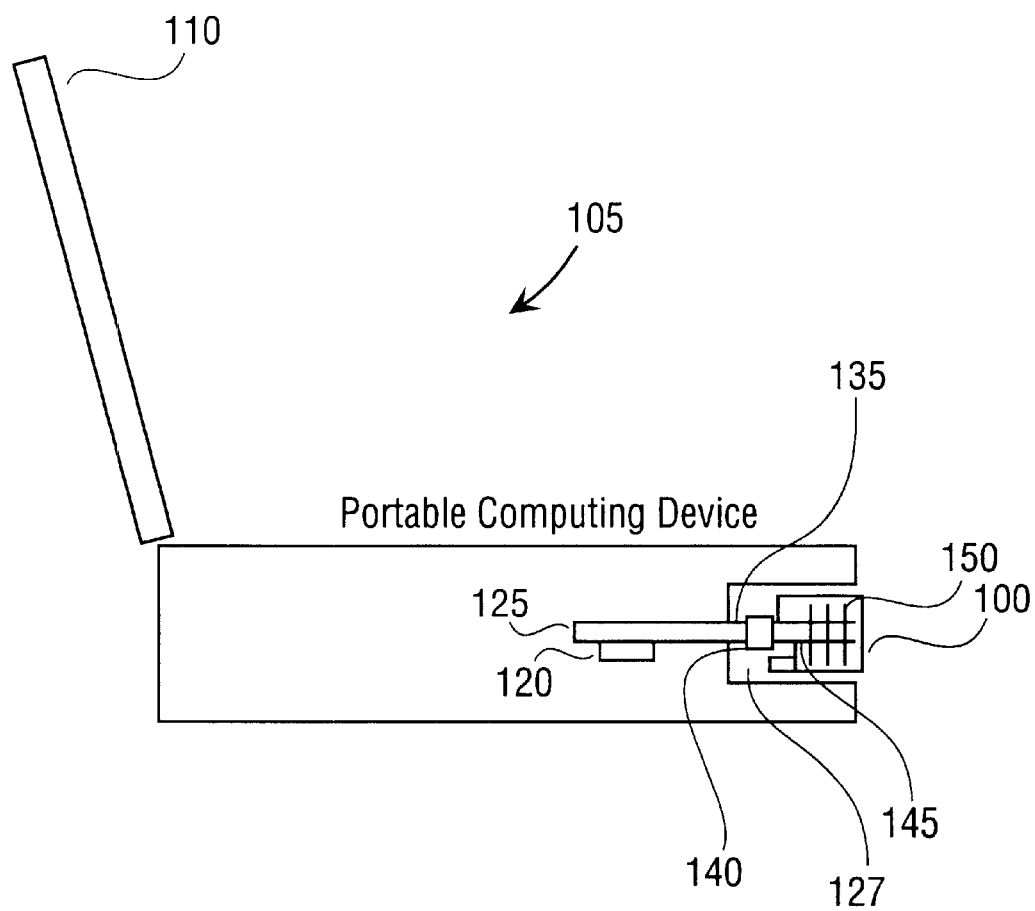
FIG. 1a illustrates a side cross section elevation view of one embodiment of a portable computing device and a device bay heat exchanger according to one embodiment.

FIG. 1a illustrates one embodiment of the present invention. A portable computing device 105 may be a laptop computer, a notebook computer, or any other portable computing device. The portable computing device 105 includes at least an electronic component 120 and a heat transfer element 125 to convey heat away from the electronic component. Additionally, the portable computing device includes a base 115 and a display 110 hingedly mounted at one edge of the base 115.

In one embodiment, the electronic component 120 is a processor; however, other components or regions of the portable computing device may be cooled according to the present invention. In a typical laptop or notebook computer, many other components are present. A memory system, a disk and/or CD ROM drive, audio and video hardware, connectivity (i.e., network and modem) hardware, as well as a power supply may all be present. These or other individual components as well as circuit boards or regional heat sinks within the portable computing device 105 may be cooled according to the present invention.

Also shown in FIG. 1a is a device bay 127, which is an aparature in the housing of the computing device that may house exchangeable components. For example, the device bay may house a disk drive, a CD ROM drive, a battery, or other devices that may be inserted and taken out of the computing device. In embodiment, the devices that may be interchangeable with the device bay may be hot swappable (i.e., can be inserted and be operable, and taken out, without restarting the computing device).

Figure 2A:
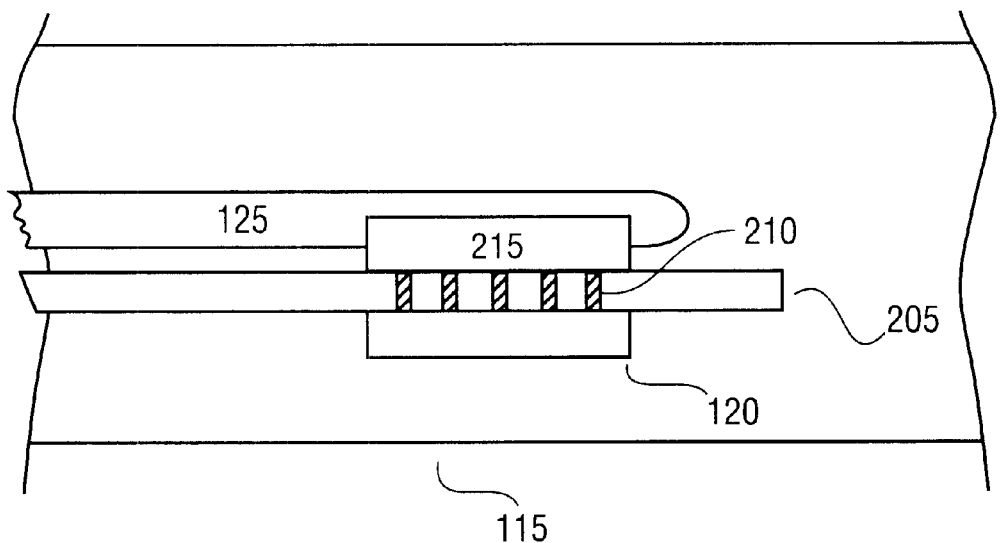
FIG. 2a illustrates a partial cross section elevation view of the connection of a heat transfer element to an electronic component according to one embodiment.

A first portion near one end of the heat transfer element 125 is thermally coupled to the electronic component 120. FIG. 2a illustrates the thermal coupling of the electronic component 120 to the heat transfer element 125. The electronic component 120 is mounted on one side of a motherboard 205 and may be thermally coupled to the heat transfer element 125 via several heat conducting components. In the embodiment of FIG. 2a, the heat conducting components include motherboard vias 210 and a heat conducting block 215. In one embodiment, the block 215 is an aluminum block and the vias 210 are filled with solder. The heat transfer element 125 is affixed to the heat conducting block 215 using solder, thermal epoxy, or other suitable means as are known in the art. This type of mounting may be preferable if the electronic component does not have a rigid package which can withstand a direct connection with the heat transfer element 125.

Figure 2B:
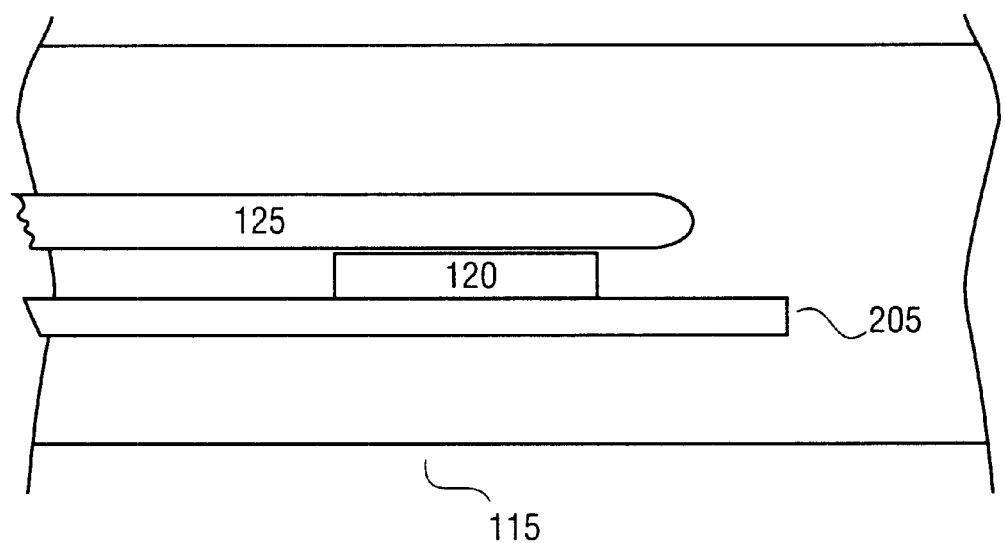
FIG. 2b illustrates a partial cross section elevation view of the connection of a heat transfer element to an electronic component according to another embodiment.

FIG. 2b illustrates another embodiment in which the heat transfer element 125 is directly mounted on an outer surface of the electronic component 120 using a thermal epoxy, solder, or similar means. The inner surface of the component is affixed to the motherboard 205. Either of these types of connections may be used as well as any other means of thermally coupling the electronic component 120 and the heat transfer element 125.

An end portion 135 of the heat transfer element 125 may be exposed into the device bay of the portable computer device 105 via a closeable door/latch, which may also prevent the heat transfer element 125 from being exposed in the bay when a device other than a heat exchanger is present in the bay. Mechanisms well known in the art may be used to cause the door/latch to open either automatically or manually.

The device bay heat exchanger 100 includes a second heat transfer element 145. A heat exchange mechanism is formed by the heat transfer elements 125 and 145. One end of the heat transfer element 145 conformally engages the end portion 135 of the heat transfer element 125 when the device bay heat exchanger is inserted into the portable computing device 105. As illustrated in FIG. 1a, in one embodiment, the heat exchange mechanism is formed by a female end of the heat transfer element 145 engaging a male connector end of the heat transfer element 125. Alternately, these mechanisms may be reversed; however, the smaller male end is more appropriate for the portable computing device 105.

Figure 1B:
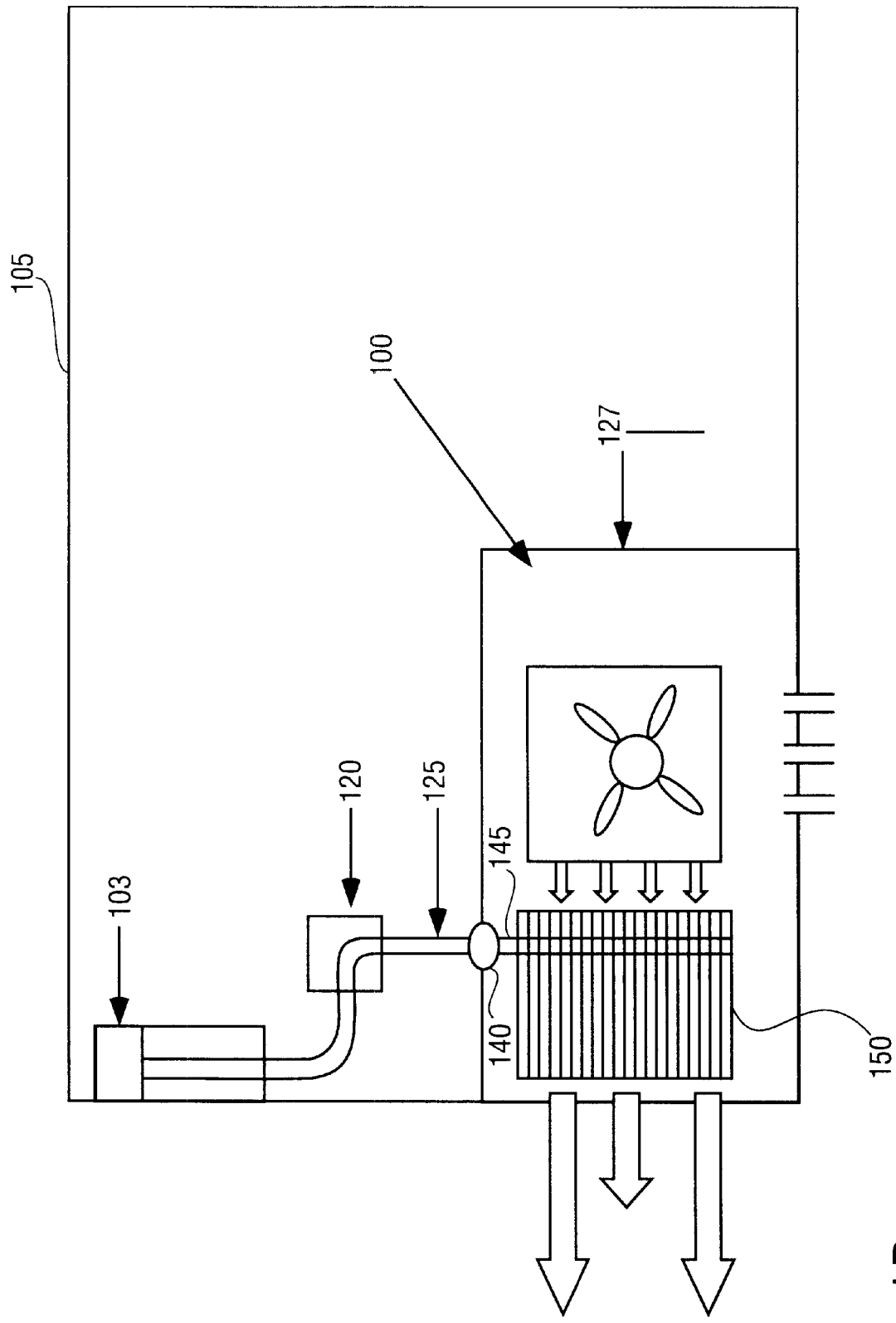
FIG. 1b illustrates a top cross section elevation view of one embodiment of a portable computing device and a device bay heat exchanger according to one embodiment.

Further illustrated in FIG. 1b is cut-away view from a top perspective of the computing device 105. As shown in FIG. 1b, the computing device includes the device bay 127 that has a device bay heat-exchanger 100 inserted in the device bay. As further shown in FIG. 1b, the computing device may also include a conventional heat exchanger/thermal solution 103, in addition to the device bay heat exchanger 100.

In one embodiment, both the heat transfer elements 125 and 145 are cylindrical or at least substantially cylindrical heat pipes. Such heat pipes have high thermal conductivity and may be smaller than one-quarter inch in diameter and still be able to dissipate sufficient power for some systems. In this embodiment, the female end forms a larger hollow cylinder substantially surrounding a portion of the male end. In other embodiments, the female end may form a square engaging receptor for the male end. Additionally, one or both of the heat pipes may be rectangular or another shape, and the female end may fully encircle the male end or may have two or more separate engaging portions which partially surround the male end. Furthermore, the heat transfer elements may be other efficient heat conductors such solid metals, conductive fibers or other similar materials known in the art.

Figure 3:
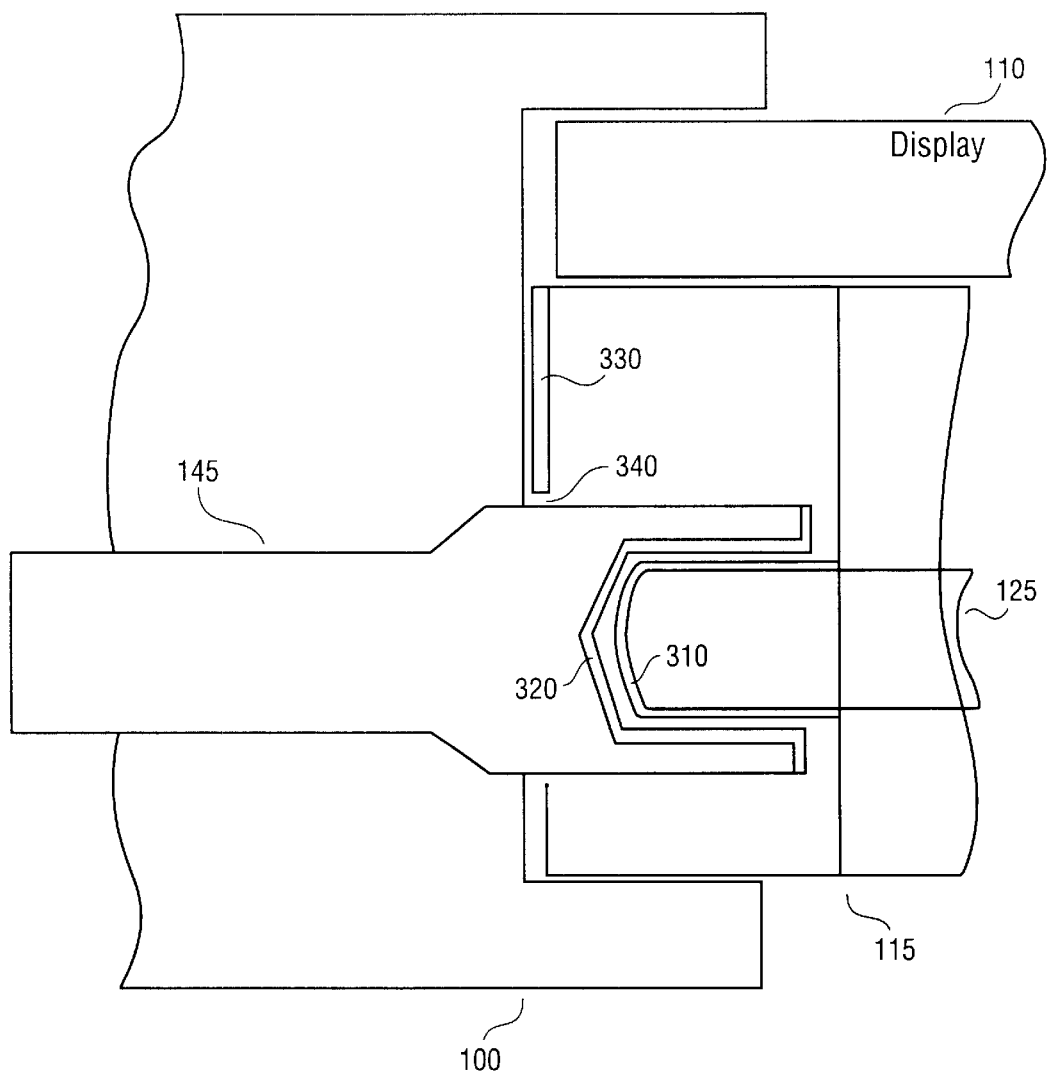
FIG. 3 illustrates a partial cross section elevation view of a male/female heat exchanger according to one.

FIG. 3 shows an enlarged view of an embodiment of the heat exchange mechanism of FIG. 1. In this embodiment, the male end of the heat transfer element 125 is coated with a hardened coating 310. Additionally, the female end of the heat transfer element 145 is coated with a hardened coating 320. These coatings help prevent wear on the heat conductors yet do not significantly impede heat transfer. Any known solid state coating such as molybdenum may be used.

One alternative to the male/female heat exchange mechanism illustrated in FIG. 1 and FIG. 3 is a "jaws" heat exchange mechanism as shown in FIG. 4. The jaws heat exchanger utilizes two engaging surfaces 415a and 415b to thermally couple heat transfer elements 400a and 400b to the heat transfer element 125. The engaging surfaces are typically thermally conductive (e.g., a metal such as copper) fittings shaped to conformally engage the heat transfer element 125. As the device bay of the portable computing device 105 is mated with the device bay heat exchanger 115, the two springs 410a and 410b respectively urge the engaging surfaces 415a and 415b into contact with the heat transfer element 125.

The springs 410a and 410b are mounted by mounting elements 405a and 405b to the housing of the device bay heat exchanger 100. The heat transfer elements 400a and 400b are slideably secured by guides 425a and 425b. Typically, the engaging surfaces 415a and 415b form a narrower opening than the heat transfer element 125 such that the engaging surfaces 415a and 415b move laterally in response to the insertion force of the heat transfer element 125 upon mating of the device bay heat exchanger 100 and the device bay of the portable computing device 105.

The heat transfer elements 400a and 400b also include heat dissipation fins 430a and 430b. A fan 420 may also be affixed to the housing of the device bay heat exchanger 100 in order to further improve heat dissipation.

Figure 4A:
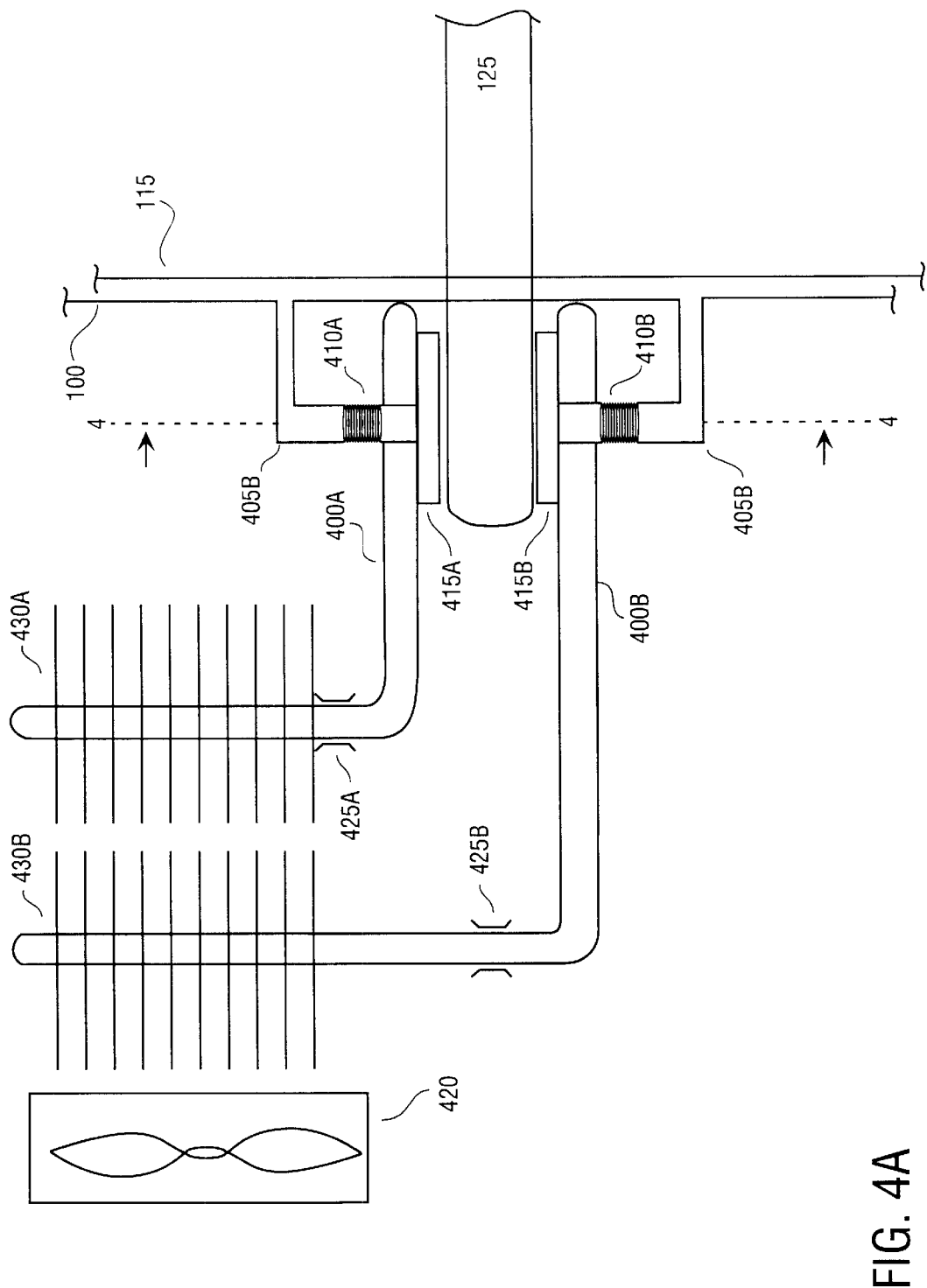
FIG. 4a illustrates a jaws heat exchanger according to one embodiment.
Figure 4B:
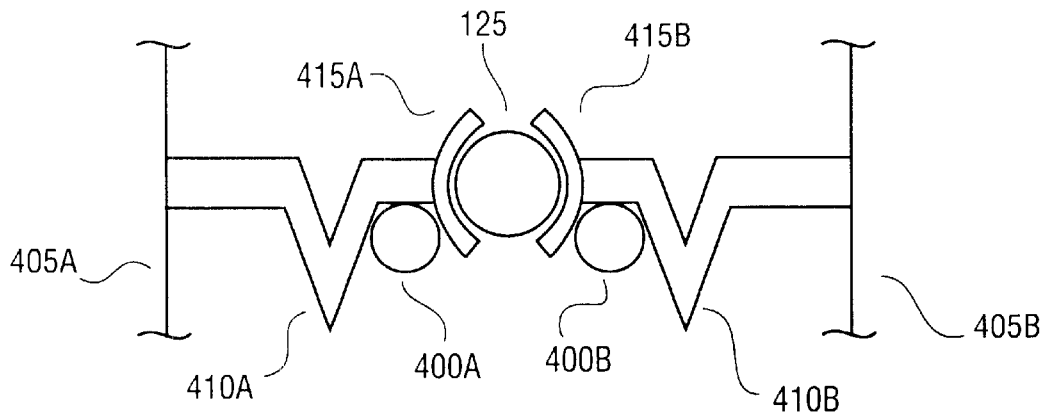

FIG. 4b illustrates a partial cross section elevation view of the jaws heat exchanger shown in FIG. 4a for one embodiment. This embodiment utilizes leaf spring mechanisms 410a and 410b to urge the engaging surfaces 415a and 415b against the heat transfer element 125. The heat transfer elements 400a and 400b are typically soldered to the engaging surfaces 415a and 415b, though other thermally conductive connections such as thermal epoxy may be used.

Figure 4C:
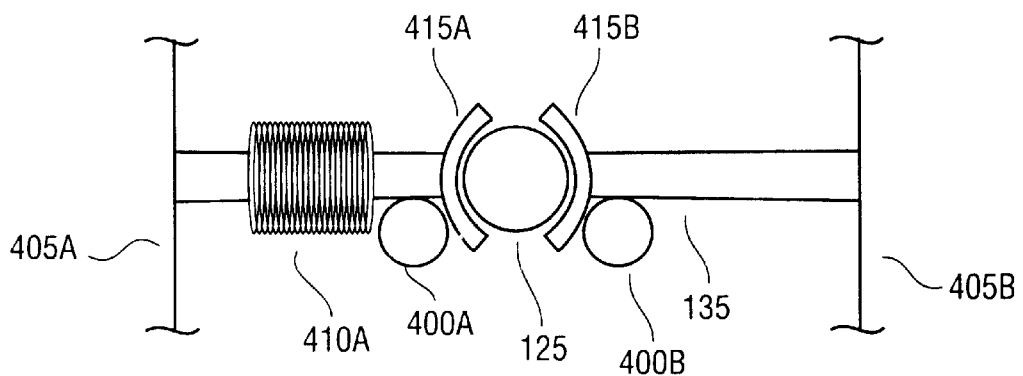
FIG. 4c illustrates a partial cross section elevation view of a jaws heat exchanger according to another embodiment.

FIG. 4c illustrates an alternate embodiment of a jaws heat exchanger which uses a single helical spring 410a attached to the engaging surface 415a to engage the heat transfer element 125. In this embodiment, a rigid mounting 435 affixes the other engaging surface 415b to the mounting element 405b which in turn is connected to the housing of the device bay heat exchanger 100. Thus, only the heat transfer element 400a moves when the heat transfer element 125 is inserted into the heat exchange jaws.

FIG. 4d illustrates a partial cross section elevation view of another embodiment of the jaws heat exchanger which uses multiple helical springs 440a, 440b, 440c, and 440d as well as a rectangular heat transfer element 125. The helical springs are secured to the mounting elements 405a and 405b by additional mountings 445a, 445b, 445c, and 445d. In this embodiment, the engaging surfaces 415a and 415b include straight portions to conformally engage the heat transfer element 125. The heat transfer elements 400a and 400b are mounted between the helical springs in a more central position on the engaging surfaces 415a and 415b. This embodiment may also provide improved stability for the engaging surfaces 415a and 415b.

FIG. 4e illustrates another embodiment of the jaws heat exchanger as well other heat dissipation components within the device bay heat exchanger 100. For perspective, cutaway portions of the base 115 and the device bay heat exchanger 100 are shown. In this embodiment, a single spring 450 separates the two heat transfer elements 400a and 400b. When the heat transfer element 125 is inserted between the engaging surfaces 415a and 415b, the spring 450 contracts, allowing the heat transfer elements 400a and 400b to move apart slightly to accommodate the heat transfer element 125. Guides 460a, 460b, 460c, and 460d provide a slideable mounting for the heat transfer elements 400a and 400b, and heat dissipation fins 455a and 455b improve system efficiency. Once again, a fan may also be included in the heat exchanger to create greater air flow in the assistance of dissipating the heat.

Figure 5:
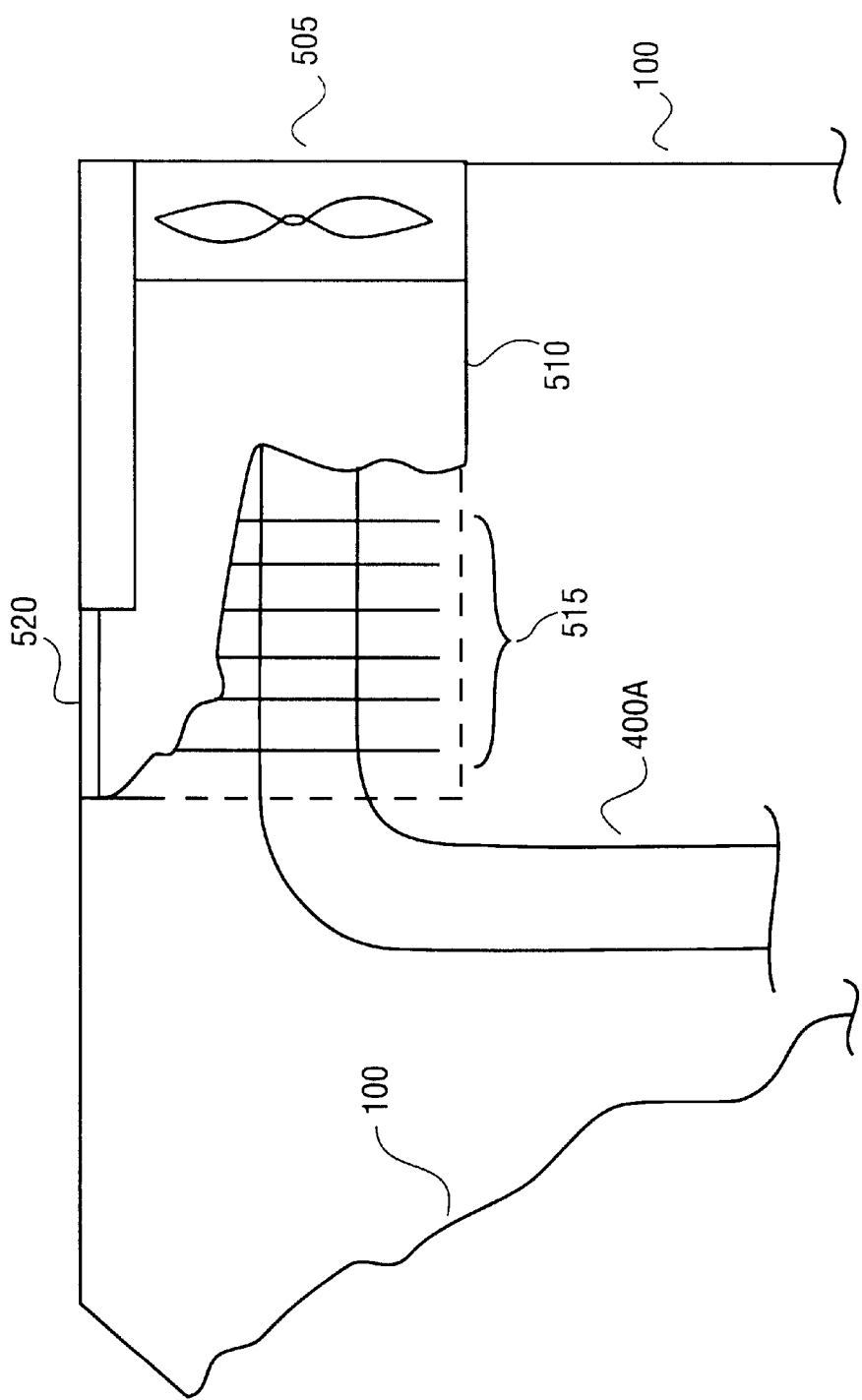
FIG. 5 illustrates a heat dissipation mechanism according to one embodiment of the present invention.

FIG. 5 illustrates an alternative embodiment of a dissipation mechanism for within the device bay heat exchanger 100. The illustration is shown only with respect to one heat transfer element 400a. Additionally, it should be noted that alternate embodiments of the jaws heat exchangers shown in FIGS. 4a through 4e can be implemented with a single heat pipe.

In FIG. 5, the heat transfer element 400a has a plurality of heat dissipation fins 515. These fins are at least partially encased in an air duct 510 which has at a first end a fan 505. As shown, the fan 505 may be affixed to the housing of the device bay heat exchanger 100. An air inlet 520 at a second end of the duct 510 is typically guarded by a screen (not shown). While the inlet is shown on a side of the duct 510, the inlet 520 may also be situated in other locations. The device bay heat exchanger 100 may also rely on air vents located throughout its housing rather than supplying a particular inlet for the duct 510. Additionally, longitudinal heat fins (i.e. axially situated along the portion of the heat transfer element 400a in the duct 510 and extending parallel to airflow from the fan 505) may be used to improve airflow through the duct 510.

Thus, the method and apparatus of the present invention a number of heat exchanger solutions for a portable computing device. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed:

1. A heat exchanger comprising:
   a first heat transfer element having a first portion for thermally coupling to an electronic component;
   a housing adapted to be inserted into a device bay of a computer system, the device bay configured to house one of a disk drive and CD ROM drive, wherein the device bay is further configured to interchange hot swappable devices, said housing including a second heat transfer element removably and conformally engaged to the first heat transfer element.

2. The heat exchanger of claim 1, wherein the first and the second heat transfer elements comprise a male connector and a female receptacle end adapted to engage the male connector.

3. The heat exchanger of claim 1, further comprising a jaw receptor end, the jaw receptor end conformably engaging the first heat transfer element and being thermally coupled to the second heat transfer element.

4. An apparatus comprising:
   a computing device comprising:
      a base containing an electronic component;
      a first heat transfer element leaving a first portion thermally coupled to the electronic component and having a second portion positioned at a device bay, the device bay configured to house one of a disk drive and CD ROM drive, wherein the device bay is further configured to interchange hot swappable devices;
   a device bay heat exchanger comprising:
      a housing having a mating end adapted to mate with the device bay of the computing device;
      a second heat transfer element having a first end adapted to engage the second portion of the first heat transfer element.

5. The apparatus of claim 4, wherein the first heat transfer element is a heat pipe.

6. The apparatus of claim 5, wherein the heat pipe is mechanically affixed to the electronic component.

7. The apparatus of claim 5, wherein the heat pipe is indirectly affixed to the electronic component by one or more heat conducting components.

8. The apparatus of claim 5, wherein the electronic component is a processor.

9. The apparatus of claim 4, wherein the second portion of the first heat transfer element and the first end of the second heat transfer element comprise a male connector and a female receptacle end adapted to engage the male connector.

10. The apparatus of claim 9, wherein the female receptacle end is disposed at the mating end of the housing of the device bay heat exchanger.

11. The apparatus of claim 4, wherein the second portion of the first heat transfer element and the first end of the second heat transfer element comprise a male connector and a jaw receptor end.

12. The apparatus of claim 11, wherein the jaw receptor end is disposed at the mating end of the housing of the device bay heat exchanger.

13. The apparatus of claim 12, wherein the jaw receptor end comprises a first engaging surface urged by a spring mechanism to engage the second portion of the first heat transfer element, wherein the second heat transfer element is thermally coupled to the first engaging surface.

14. The apparatus of claim 13, wherein the jaw receptor end further comprises a second engaging surface urged by a second spring mechanism to engage the second portion of the first heat transfer element.

15. The apparatus of claim 14, wherein the first heat transfer element is a substantially cylindrical heat pipe and the first engaging surface and the second engaging surface conformally engage the substantially cylindrical heat pipe.

16. The apparatus of claim 15, wherein the second engaging surface is thermally coupled to a third heat transfer element and wherein the second heat transfer element and the third heat transfer element are heat pipes which are affixed respectively to the first engaging surface and the second engaging surface.

17. A computing apparatus comprising:

a base;

an electronic component disposed within the base;

a device bay, the device bay configured to house one of a disk drive and CD ROM drive, wherein the device bay is further configured to interchange hot swappable devices; and a heat pipe having a first portion thermally coupled to the electronic component and having a second portion positioned in a portion of the device bay, said second portion adapted to engage a device bay heat exchanger.

18. The computing apparatus of claim 17, wherein the device bay of the computing apparatus includes a closeable aperture which exposes the second portion of the heat pipe when the device bay engages the device bay heat exchanger.

* * * * *